(12) United States Patent
Pierenkemper et al.

(10) Patent No.: US 6,641,042 B1
(45) Date of Patent: Nov. 4, 2003

(54) METHOD AND AN APPARATUS FOR THE IDENTIFICATION AND LOCALIZATION OF OBJECTS

(75) Inventors: Hans-Werner Pierenkemper, Emmendingen (DE); Reinhold Kilian, Waldkirch (DE); Jürgen Reichenbach, Emmendingen (DE)

(73) Assignee: Sick AG, Waldkirch (DE)

( * ) Notice: Subject to any disclaimer, the term of this patent is extended or adjusted under 35 U.S.C. 154(b) by 209 days.

(21) Appl. No.: 09/644,061

(22) Filed: Aug. 22, 2000

(30) Foreign Application Priority Data

Aug. 25, 1999 (DE) .......................... 199 40 403

(51) Int. Cl.[7] .................................................. G06K 7/10
(52) U.S. Cl. ............. 235/462.01; 235/461; 235/462.46; 235/472.02
(58) Field of Search .................. 235/462.01, 461, 235/462.46, 472.02, 470

(56) References Cited

U.S. PATENT DOCUMENTS

| | | | | |
|---|---|---|---|---|
| 5,091,636 A | * | 2/1992 | Takada et al. | 235/454 |
| 5,557,096 A | * | 9/1996 | Watanabe et al. | 235/375 |
| 5,949,059 A | * | 9/1999 | Rawson et al. | 235/487 |
| 5,971,587 A | * | 10/1999 | Kato et al. | 340/10.34 |
| 6,092,727 A | * | 7/2000 | Bogdan et al. | 235/454 |
| 6,102,291 A | * | 8/2000 | Mazzone | 235/462.01 |
| 6,184,789 B1 | * | 2/2001 | Richley et al. | 340/571 |
| 6,251,211 B1 | * | 6/2001 | Lake | 156/273.3 |
| 6,307,919 B1 | * | 10/2001 | Yoked | 235/383 |
| 6,325,289 B1 | * | 12/2001 | Mazzone | 235/462.14 |
| 6,357,662 B1 | * | 3/2002 | Helton et al. | 235/462.45 |
| 6,384,712 B1 | * | 5/2002 | Goldman et al. | 340/10.3 |
| 6,448,886 B2 | * | 9/2002 | Garber et al. | 340/10.1 |

FOREIGN PATENT DOCUMENTS

| | | |
|---|---|---|
| DE | 29800833 U1 | 5/1998 |
| FR | 2648592 | 12/1990 |
| JP | 200100593 A * | 1/2001 |
| WO | WO 99/05660 | 2/1999 |

* cited by examiner

*Primary Examiner*—Thien M. Le
*Assistant Examiner*—Allyson Sanders
(74) *Attorney, Agent, or Firm*—Townsend and Townsend and Crew LLP

(57) ABSTRACT

A method is described for the identification and localization of objects, where at least one transponder provided on the respective object is excited to emit transponder data stored in the transponder which characterize the respective object and where the transponder data emitted are detected. The object is additionally scanned by at least one optical sensor. Furthermore, the object is identified and its location determined from a combination of optical data detected by the optical sensor and the transponder data identified. Furthermore, a corresponding apparatus for the performance of the method is described.

17 Claims, 1 Drawing Sheet

METHOD AND AN APPARATUS FOR THE IDENTIFICATION AND LOCALIZATION OF OBJECTS

BACKGROUND OF THE INVENTION

A method is described for the identification and/or localization of objects where at least one transponder provided on the respective object is excited to emit transponder data stored in the transponder which characterize the respective object and where the transponder data emitted are detected. The invention is further directed to an apparatus for the performance of this method.

Transponders used in corresponding methods and apparatuses are also termed RFID transponders (radio frequency identification transponders) as, conventionally, a large coil and a capacitance are present in the transponder, with the coil being excited by a high-frequency magnetic field which is transmitted via a coil of an RFID reading device forming an antenna. In this way, a voltage is generated in the coil of the transponder which acts as the power supply for the transponder.

The transponder conventionally contains a microprocessor which is supplied with power in this way and which emits transponder data stored in the transponder by controlling the current in the coil of the transponder by means of a corresponding magnetic field. This modified magnetic field effects a change in the current or the voltage in the coil of the reading device so that the transponder data emitted are detected by the reading device.

The use of such transponders provides a number of advantages. On the one hand, a relatively large amount of data can be stored in a transponder so that the corresponding information content is very high. In addition, not only read-only transponders exist, but also rewritable transponders so that, if necessary, the data contained can also be modified or added to. Another advantage is that the optical path between the reading device and the object does not need to be unobstructed as reading is performed by inductive coupling and that, for the same reason, a corresponding apparatus is not sensitive to dirt.

However, in addition to these advantages, the following disadvantages also exist. It is particularly problematic that an exact localization of a transponder is not possible. This is a problem when objects are to be recognized which follow very closely on one another. When several objects are simultaneously located in the reading field of a reading device, a clear localization of a transponder and thus of the object carrying the transponder is not possible.

Another disadvantage is that reading is frequently not possible if the transponder is located in the vicinity of metallic objects such as an aluminum case. Another problem is the still relatively low popularization due to the low degree of standardization.

SUMMARY OF THE INVENTION

It is an object of the invention to provide a method and an apparatus of the kind first given in such a way that an exact localization and a clear identification of an object is also possible in the above-mentioned problematic cases.

This object is satisfied in accordance with the invention starting from a method of the kind first given by the object additionally being scanned by at least one optical sensor and by the object being identified and its location determined from a combination of optical data detected by the optical sensor and the detected transponder data.

An apparatus formed in accordance with the invention comprises an electromagnetic sensor unit, with which at least one transponder provided on the respective object can be excited to emit transponder data stored in the transponder which characterize the respective object and with which the transponder data emitted can be detected, with an optical sensor to scan the object and an analysis unit to clearly identify the object and/or to determine the location of the object from a combination of optical data detectable by the optical sensor and the emitted transponder data which can be detected being additionally provided.

By means of the combination of an RFID system with an optical scanning unit, the advantages of the two different systems are optimally combined with one another. Optical scanning units have the advantage that an exact localization is possible. The disadvantages of optical scanning systems, namely of relatively low information content, sensitiveness to dirt and the need for an optically unobstructed path between the sensor and the object, are compensated for by the corresponding properties of the transponder system. Both a clear identification and a clear localization of an object provided with a corresponding transponder is thus possible by means of the combination in accordance with the invention of an optical scanning unit and an RFID system.

In accordance with an advantageous embodiment of the invention, the localization is performed by an analysis of the optical data and/or the identification of the object by analyzing the transponder data. As an exact determination of the location of the object is possible by means of the optical detection unit if two or more objects, for example, are detected within a reading field by the reading device of the transponder, the location of the objects can be determined by means of the optical analysis unit by an analysis of the optical data of the respective object. It is also possible, as is described in more detail below, to achieve both a clear identification and a clear determination of the location of the object even with an incomplete recognition of the optical and/or transponder data by means of an analysis of a corresponding combination of these data.

In accordance with a preferred embodiment of the invention, a barcode arranged on the object is detected and decoded by the optical sensor, with the object being identified and/or its location determined from the decoded barcode data together with the transponder data. The use of barcodes arranged on the object allows, on the one hand, a reasonably priced and globally standardized method of optical scanning, with the coordinates of the barcode read being able to be determined very precisely in space by means of conventional barcode scanning units. As the maximum information content of barcodes is relatively low and comprises, for example, around 30 to 50 characters with one-dimensional scanning, transponder data with a substantially larger information content stored in the transponder can, if required, be received and analyzed.

A method in accordance with the invention can further be advantageously characterized by at least a part of the data stored in the transponder corresponding to the data encoded in the barcode, by the transponder data detected being compared to the corresponding decoded barcode data, by an agreement between the recognized partial barcode data and the detected transponder data being sought in the event of incompletely recognized barcode data and, if such agreement is found accordingly, by the object being identified by the transponder data and its location being determined as the location of the partially decoded barcode.

In this way, it is possible that both a clear identification and an exact localization of the object are possible even with an incomplete detection of the barcode present on the object. If, for example, multiple transponders are detected within the reading area, the object identification data contained in the transponder data are compared to the identification data detected by means of the barcode. In the case of an incomplete detection of the barcode data, for example due to dirt on or a partial covering of the barcode, agreement is sought between the recognized partial barcode data and the detected transponder data and, in the event of such agreement being accordingly found, the object is identified in accordance with the transponder data. The location can be determined using the partially recognized barcode location which can be determined exactly by means of the barcode detection unit.

In accordance with another advantageous embodiment, the reading reliability can be substantially increased by the combination in accordance with the invention, as the information used for the identification is encoded and read out in two different ways with different physical principles. In accordance with the invention, this is advantageously performed by at least a part of the data stored in the transponder corresponding to the data encoded in the barcode, by the transponder data detected being compared to the correspondingly decoded barcode data, and by the object only being deemed to be successfully identified in accordance with the data in the case of a corresponding agreement between the transponder data and the barcode data. In this way, the system is provided with a redundancy which has a very small error liability due to the different physical properties of the transport paths.

In accordance with another advantageous embodiment of the invention, the optical reflectance profile of the object is determined by the optical sensor, the reflectance profile determined is examined for values typical for the optical design of the transponder for the optical detection of the location of the transponder, and, if the transponder is recognized, the localization of the object is performed by an analysis of the recognized location of the transponder and the identification of the object by the analysis of the transponder data detected.

Thus, instead of a barcode, the optical reflectance profile of the object can also be detected and analyzed by an optical detection unit. For the recognition of the transponder, the detected reflectance profile of the object can be examined, in particular, for unmistakable areas of given optical properties, for example, color, brightness, shape or the like, with, if one single corresponding area is recognized on the object, this area being identified as the transponder. The location of the transponder in space can, in turn, be precisely determined by this optical analysis so that an exact association can be made between the transponder location and the transponder data identifying the object.

In accordance with another advantageous embodiment of the invention, the optical reflectance profile of the scanned object is determined by the optical sensor, the reflectance profile determined is compared to a reflectance profile of the object bearing the transponder determined from the transponder data detected and stored in the transponder, and, in the event of sufficient agreement between the reflectance profiles, the scanned object identified by the transponder data detected.

If objects following on from one another have clearly distinguishable reflectance profiles, a clear identification of the respective object by means of the reflectance profile detected is possible in the manner described by the storing of said reflectance profiles in the transponder provided on the respective object. In turn, an exact determination of the location of the respective object is possible using the optical detection so that a clear association of the transponder with the object is also possible in this way and thus a determination of the location of the object is achieved.

It is furthermore also possible that geometrical data of the object, for example the contour and/or the length and/or the width and/or the height of the scanned object, are determined by the optical sensor, that the geometrical data determined are compared to corresponding geometrical data of the object bearing the transponder determined from the transponder data detected and stored in the transponder, and that, in the event of sufficient agreement between the geometrical data, the scanned object is identified by the transponder data detected. Analogous to the analysis of the reflectance profile, it is thus possible to perform a clear association of the respective transponder with the respective object using the geometrical data stored in the transponder and a comparison to correspondingly detected geometrical data of objects following on from one another having clearly distinguishable geometrical data. An unmistakable identification and localization of the objects detected is thus also possible in this way.

The detection of a barcode, the geometrical data and the reflectance profile can be performed singly in each case or also in any combinations thereof. Using laser scanners of current designs, the barcode, geometrical data and the reflectance profile can, for example, be detected simultaneously, whereby increased redundancy and/or an improvement in the reliability of the results is achieved.

The invention is described in more detail below by means of an embodiment with reference to the drawing.

DESCRIPTION OF THE PREFERRED EMBODIMENTS

Figure 1:
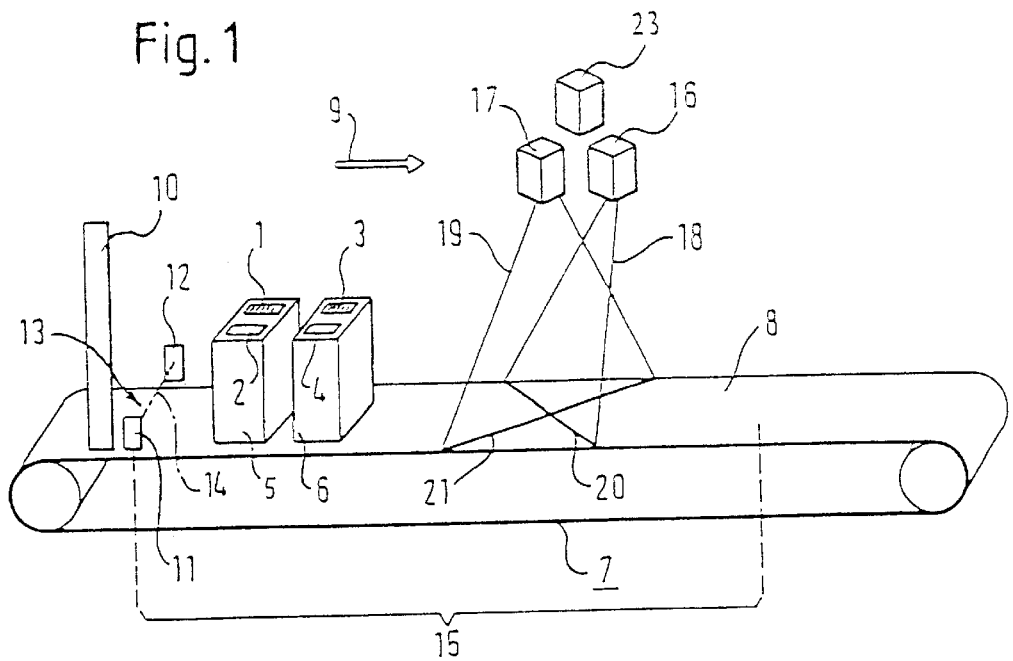
FIG. 1 shows a schematic perspective representation of a scanning apparatus designed in accordance with the invention.

In FIG. 1, two objects 5, 6 provided in each case with a bar code 1, 3 and a transponder 2, 4 are arranged on a conveyor belt 7 whose upper run 8 is movable along the direction of an arrow 9. The objects 5, 6 are arranged at a relatively small distance to one another in the direction of transportation 9.

An optional height detection device 10 and a light barrier 13 comprising a transmitter 11 and a receiver 12 are disposed at the start of the conveyor belt 7, with a light beam 14 being emitted by the transmitter 11 in the direction of the receiver. The light barrier defines the start of a reading area 15 within which the barcodes 1, 3 are scanned and the transponders 2, 4 excited by two optical detection units arranged above the conveyor belt 7 and formed as barcode readers 16, 17 and by an RFID reading device 23 respectively. The transponder data emitted by the transponders 2, 4 through this excitation are, in turn, received by the RFID reading device 23.

The barcode readers 16, 17 each transmit a scanning beam 18, 19, which is, for example, deflected by a polygonal mirror wheel, in the direction of the conveyor belt 7 so that scan lines 20, 21 are imaged on the conveyor belt 7. When the objects 5, 6 are moved in the direction of the arrow 9, the barcodes 1 and 3 are each swept over at least partially or in full by the scan lines 20, 21 so that the information contained in the barcodes 1, 3 is decoded and forwarded to an analysis circuit (not shown) for further analysis. It is possible here that barcodes only swept over in part can be put together by the analysis circuit to form a complete barcode and that, in this way, the whole barcode can be decoded.

The RFID reading device 23 generates a high-frequency electromagnetic field which is emitted in the direction of the objects 5, 6 via an antenna coil. As the objects 5, 6 accordingly approach the RFID reading device 23, the transponders 2, 4 have an effect on the high-frequency magnetic field by means of transformatory coupling in such inductive systems. For example, when the objects 5, 6 enter the reading area 15, the high-frequency magnetic field generates a voltage in coils provided in the transponders 2, 4 respectively by means of which a microprocessor also provided in the transponders 2, 4 is supplied with power. The microprocessor excited in this way in turn again controls the current in the respective coil of the transponder 2, 4, whereby, in turn, a change is effected in the current or voltage within the primary coil of the RFID reading device 23 formed as an antenna. By controlling the coil current inside the transponder 2, 4, transponder data stored in the transponders 2, 4 can thus be transmitted to the RFID reading device 23.

In the case of larger distances between the transponders 2, 4 and the RFID reading device 23, the data transfer can be performed by means of electromagnetic waves (radio waves), with transponders 2, 4 having their own power supply preferably being used in this case.

While two barcode readers 16, 17 are provided in the embodiment represented in FIG. 1, the invention can also be performed with only one barcode reader or with multiple barcode readers. Equally, instead of a single RFID reading device 23, multiple corresponding reading devices can be provided.

While a localization of the transponders 2, 4 and thus of the objects 5, 6 within the reading area 15 is only possible relatively imprecisely with the RFID reading device 23, a very precise localization of the barcodes 1, 3 and thus of the objects 5, 6 within the reading area 15 is possible with the barcode readers 16, 17.

Figure 2:
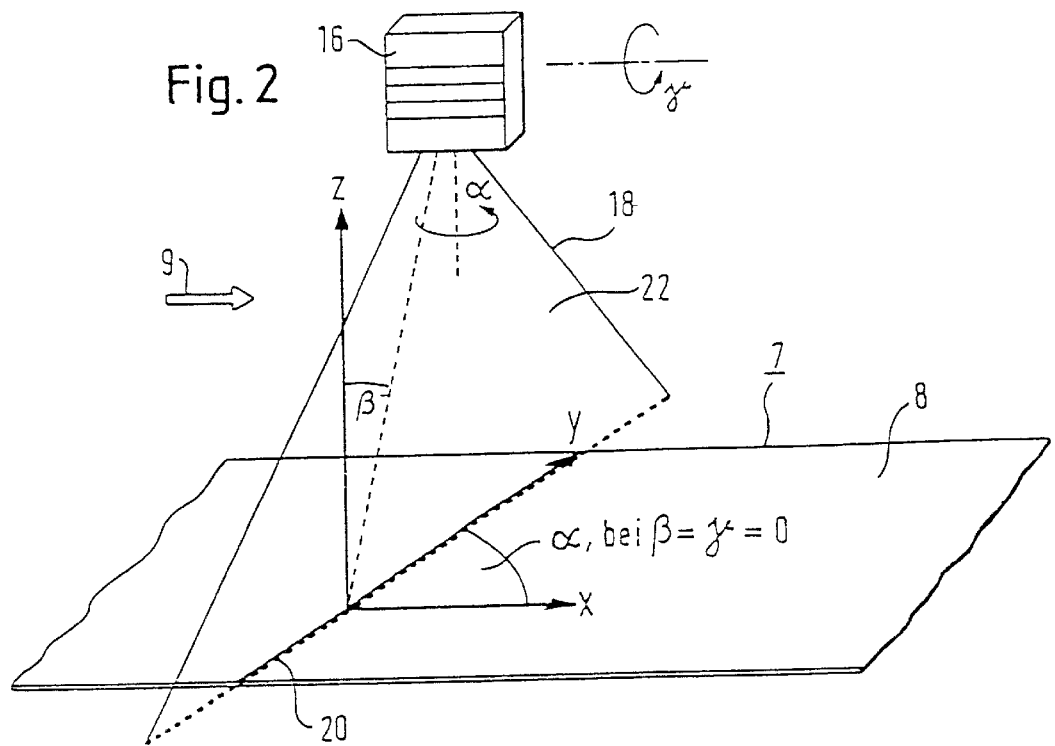
FIG. 2 shows a detail view from FIG. 1.

To illustrate the localization by means of optical scanning, the different scan angles $\alpha$, $\beta$ and $\gamma$ are shown in FIG. 2. For reasons of simplification, only barcode reader 16 is shown in FIG. 2.

The angle $\alpha$ indicates a rotation of the barcode reader 16 around the z axis, with $\alpha=0°$ when the scan line 20 is parallel to the x axis.

The angle $\beta$ defines the tilt around the y axis of the V-shaped scan plane 22 formed by the periodically rotated scanning beam 18, with the angle $\beta$ being selected as negative for the resulting scanning direction against the arrow direction 9 shown in FIG. 2.

The angle $\gamma$ indicates a tilting of the barcode reader 16 around the x axis so that an angle $\gamma=0°$ indicates a reading perpendicularly from above on the conveyor belt 7 and an angle $\gamma \neq 0°$ a reading from the side. The determination of the location of a barcode during the normal scanning operation can be performed at $\gamma=0°$, i.e. for a reading from above, for example using the following equations:

$$x = x_0 + d_0 * \sin(\text{scanw}) * \cos(\alpha) - d_0 * \sin(\beta_2) * \sin(\alpha) * \cos(\text{scanw})$$

$$y = y_0 + d_0 * \sin(\text{scanw}) * \sin(\alpha) + d_0 * \sin(\beta_2) * \cos(\alpha) * \cos(\text{scanw})$$

$$z = z_0 - d_0 * \cos(\text{scanw}) * \cos(\beta_2)$$

For $\gamma \neq 0°$, the location of the barcode results as follows using the values of the equations given above:

$$x_\gamma = x$$

$$y_\gamma = y_0 + \cos(\gamma) * (y - y_0) - \sin(\gamma) * (z - z_0)$$

$$z_\gamma = z_0 + \sin(\gamma) * (y - y_0) + \cos(\gamma) * (z - z_0)$$

To allow the x-location value relevant for the association of the barcode to the object bearing the barcode to be determined, the incremental transducer distance, which has to be additionally associated to the barcode, has to be taken into account. A corresponding start signal for an incremental transducer can be generated, for example, when the light barrier 14 is interrupted, i.e. when an object enters the reading area 15.

"scanw" is the scan angle which indicates the location of the barcode scanned within the scan line 20. The angle bisector of the V-shaped scan plane is defined as scanw $=0°$.

$\beta_2 = \beta - (\text{schwingw})$ applies to the angle $\beta_2$, with the pivot angle schwingw indicating an optional pivot of the V-shaped scan plane 22 by means of which a three-dimensional scan pyramid is generated instead of a scan plane.

The scan angles required for the localization of the respective location coordinates of a barcode and the coordinates $x_0$, $y_0$, $z_0$ of a barcode reader are normally known from the adjustment of the system or can be determined by learning routines.

$d_0$ designates the distance between the barcode reader and the scanned barcode, which can, for example, be determined by a distance measurement.

If the light barriers are arranged in a common frame, as a rule, the respective distance of a light barrier to the outside edge of the frame is known from the factory setting so that the distance between the light barrier 13 defining the start of the reading area 15 and the outside edge of the frame has only to be calculated for all light barriers together. Generally, only the x component is relevant for the association between the barcode and the object. The y and z coordinates can, however, be taken into consideration for the plausibility check of a reading result.

The barcode locations found are calculated back to the location of the start light barrier 13 using-the x location determined and the known incremental transducer scale and then compared to the locations of the objects located in the reading area 15. If the barcode location is within the association region of an object, association is performed.

The localization described can be used not only for scanning of barcodes 1, 3, but also for another suitable optical scanning of the objects 5, 6. Examples for other suitable optical scanning methods are given in the following.

In another embodiment of the method in accordance with the invention, each barcode 1, 3 and the corresponding transponder 2, 4 of an object 5, 6, for example, contain an information code clearly identifying the respective object 5, 6.

If objects 5, 6 are arranged so closely one after the other as is shown in FIG. 1, the transponder data from both transponders 2, 4 are received by the RFID reading device 23 so that an association of the information code contained in the transponder data to the respective object 5, 6 is not possible.

If the barcodes 1, 3 can be completely read and decoded by the barcode readers 16, 17, a clear association of the information code contained in the barcodes 1, 3 respectively to the objects 5, 6 can be made solely by means of this scan.

If, however, only an incomplete reading of the barcodes 1, 3 is possible, for example due to dirt on or a partial covering of the barcodes 1, 3, then in conjunction with the transponder data detected and despite this incomplete reading of the barcode, a clear association of the information code to the objects 5, 6 can be performed, as is illustrated by the following table.

| RFID code (Transponder) | Transponder 1 = "0111ABCDEFxxxxxxxx" | Transponder 2 = "0112XYZZZZyyyyyyyy" |
|---|---|---|
| Barcode information complete | Barcode = "0111ABCDEF" | Barcode 2 = "0112XYZZZZ" |
| Recognized barcode information | "0111AB . . ." Partial string "CDEF" not recognized | " . . . 2XYZZZZ" Partial string "011" not recognized |
| Precise transponder location | Cannot be determined | Cannot be determined |
| Precise barcode location | Loc. code1 = x1, y1, z1 | Loc. code2 = x2, y2, z2 |
| Match of partial string information; Reconstructed code information | Code1 = "0111ABCDEF" | Code2 = "0112XYZZZZ" |
| Thus location of transponder information also known; Perform association of barcode-transponder-object | Object 1: Loc. code1 = x1, y1, z1 Barcode1 = "0111ABCDEF" Transponder1 = "0111ABCDEFxxxxxxxx" | Object 2: Loc. code2 = x2, y2, z2 Barcode2 = "0112XYZZZZ" Transponder2 = "0112XYZZZZyyyyyyyy" |

As the respective exact location of the barcodes 1, 3 can be determined by the barcode readers 16, 17 and as a clear association between the respective barcode and the respective transponder is possible via the comparison of the partial strings recognized by the barcode readers 16, 17 to the information codes fully received by the transponders 2, 4, a clear localization of the respective object in the reading area 15 is possible in this way.

In another embodiment of the invention, the increase in reading reliability is possible by means of a joint analysis of the transponder data detected and the optical data detected. Due to redundant, partially identical or identical information code in the respective transponder 2, 4 and the respective barcode 1, 3, the information determined from the transponders 2, 4 and the barcodes 1, 3 can be checked against one another for agreement and/or plausibility to increase reading reliability. The reading reliability of the total system can thus be improved over purely the reading of barcodes even in the case of a complete reading of the bar codes 1, 3.

The reading error rate can be substantially reduced in this process, as the information checked against one another is encoded and read in two different ways and with different physical principles.

Instead of the barcodes 1, 3 shown in FIG. 1, just the transponders 2, 4 can also be provided on the objects 5, 6. In this case, the transponders 2, 4 can be provided on the outside of the objects 5, 6 such that they can be clearly recognized on the respective object 5, 6, for example by their color, during a determination of the optical reflectance profile of the objects 5, 6.

As an exact localization is, in turn, possible from the corresponding optical scan, a clear association of the information code determined from the transponder data and characterizing the respective object can, in turn, be made to the respective transponder detected in an optical way and thus to the respective object.

While in this version the transponder must in each case be provided clearly optically recognizably on the outside of the object, in the embodiment with barcodes applied to the object, the optical visibility of the transponders on the outside of the objects is not necessary. The transponders can, for example, be arranged directly between the two layers in a barcode label made of two layers.

In another embodiment of the method in accordance with the invention, reflectance profiles and/or the respective object geometrical data of the object (length/width/height/contour) can be stored in the respective transponders of the 2, 4 respective object. When the objects 5, 6 pass through the reading area 15, the object reflectance profiles or the object geometrical data are respectively detected by the optical detection units 16, 17. Simultaneously, the object reflectance profiles or the object geometrical data respectively stored in the respective transponders 2, 4 are received by the RFID reading device 23.

In an analysis unit (not shown), the data received in each case are compared to the scanned data so that with objects 5, 6 having clearly distinguishable reflectance profiles or geometrical data, a clear association of the respective transponder 2, 4, to the object 5, 6 is again possible. In this case, a clear association can thus also be achieved by the combination of the clear localization in an optical manner and a clear object identification by the detection of the transponder data.

It is also possible in accordance with the invention to combine the embodiments described with one another so that a further improvement of the association reliability can be achieved. If one of the criterion fails, for example due to very dirty barcodes, or if a corresponding criterion cannot be used, for example in the case of a defective barcode label, then the remaining check criteria are available so that a clear association continues to be still possible.

What is claimed is:

1. A method for identification and localization of objects, where at least one transponder provided on a respective object is excited to emit transponder data stored in the transponder which characterize the respective object and where the transponder data emitted are detected, the object being additionally scanned by at least one optical sensor and the object being identified and the object location being determined from a combination of optical data detected by the optical sensor and the transponder data identified.

2. A method in accordance with claim 1, wherein the localization is performed by analysis of the optical data.

3. A method in accordance with claim 1, wherein the identification of the object is performed by analysis of the transponder data.

4. A method in accordance with claim 1, including detecting a barcode arranged on the object and decoded by the optical sensor and identifying the object and determining the object location from the decoded barcode data together with the transponder data.

5. A method in accordance with claim 4, wherein at least a part of the data stored in the transponder corresponds to the data encoded in the barcode, wherein the transponder data detected are compared to the corresponding decoded barcode data, and including seeking an agreement between the recognized partial barcode data and the detected transponder data in the event of incompletely recognized barcode data, and, if such agreement is found, identifying the object with the transponder data and determining the object location from the location of the partially decoded barcode.

6. A method in accordance with claim 1, characterized in that at least a part of the data stored in the transponder corresponds to the data encoded in the barcode, in that the transponder data detected are compared to the correspondingly decoded barcode data, and in that the object is only deemed to be successfully identified in accordance with the data in the case of a corresponding agreement between the transponder data and the barcode data.

7. A method in accordance with claim 1, wherein an optical reflectance profile of the object is determined by the optical sensor, wherein the reflectance profile determined is examined for values representative of the optical forming of the transponder for the optical detection of the location of the transponder, and wherein, if the transponder is recognized, the localization of the object is performed by analysis of the recognized location of the transponder and the identification of the object by analysis of the transponder data detected.

8. A method in accordance with claim 7 wherein, for the recognition of the transponder, the reflectance profile is examined for unmistakable areas of given optical properties, and wherein, if one single corresponding area is recognized on the object, this area is identified as the transponder.

9. A method in accordance with claim 1, wherein an optical reflectance profile of the scanned object is determined by the optical sensor, wherein the reflectance profile determined is compared to a reflectance profile of the object bearing the transponder determined from the transponder data detected and stored in the transponder, and wherein, in the event of sufficient agreement between the reflectance profiles, the scanned object is identified by the transponder data detected.

10. A method in accordance with claim 7, wherein the optical three-dimensional reflectance profile of the object is determined.

11. A method in accordance with claim 1, wherein geometrical data of the object are determined by the optical sensor, wherein the geometrical data determined are compared to corresponding geometrical data of the object bearing the transponder determined from the transponder data detected and stored in the transponder, and wherein, in the event of sufficient agreement between the geometrical data, the scanned object is identified by the transponder data detected.

12. An apparatus for identification and/or localization of objects having an electromagnetic sensor unit, with which at least one transponder provided on a respective object can be excited to emit transponder data stored in the transponder which characterize the respective object and with which the transponder data emitted can be detected, at least one optical sensor for scanning the object, and an analysis unit for the identification of the object and/or for determining the location of the object from a combination of optical data which can be detected by the optical sensor and the emitted transponder data which can be detected.

13. An apparatus in accordance with claim 12, wherein the optical sensor is formed as a barcode detection unit.

14. An apparatus in accordance with claim 12, wherein the optical sensor is formed as a reflectance detection unit.

15. An apparatus in accordance with claim 12, wherein the optical sensor is formed as a geometrical data detection unit.

16. A method according to claim 8 wherein the areas of given optical properties comprise at least one of the color, brightness and shape of the object.

17. A method for identifying and determining the location of objects, each object carrying a transponder which carries transponder data that characterizes the object comprising exciting the transponder to emit the transponder data, detecting the emitted transponder data, optically scanning the object, and identifying the object and determining its the object location with optical data concerning the object detected by scanning the object and with detected transponder data.

* * * * *